Oct. 14, 1952     L. J. ZIEGELMEYER     2,613,652
PRESSURE OPERATED RECIPROCATING VALVE
Filed Jan. 6, 1947     2 SHEETS—SHEET 2
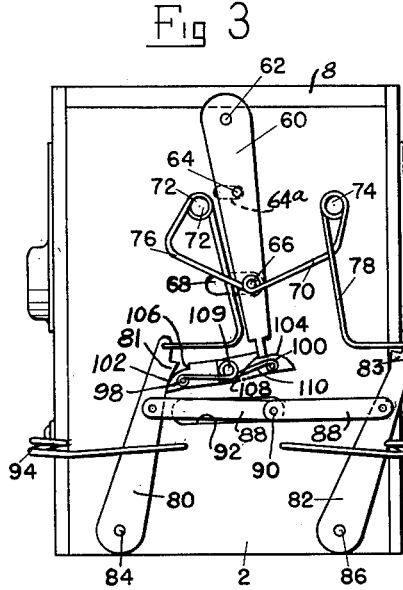
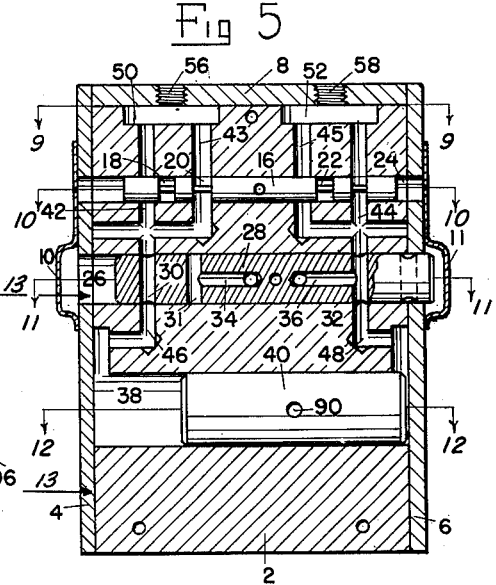
INVENTOR.
LYNN J. ZIEGELMEYER
BY Victor J. Evans & Co.
ATTORNEYS Patented Oct. 14, 1952

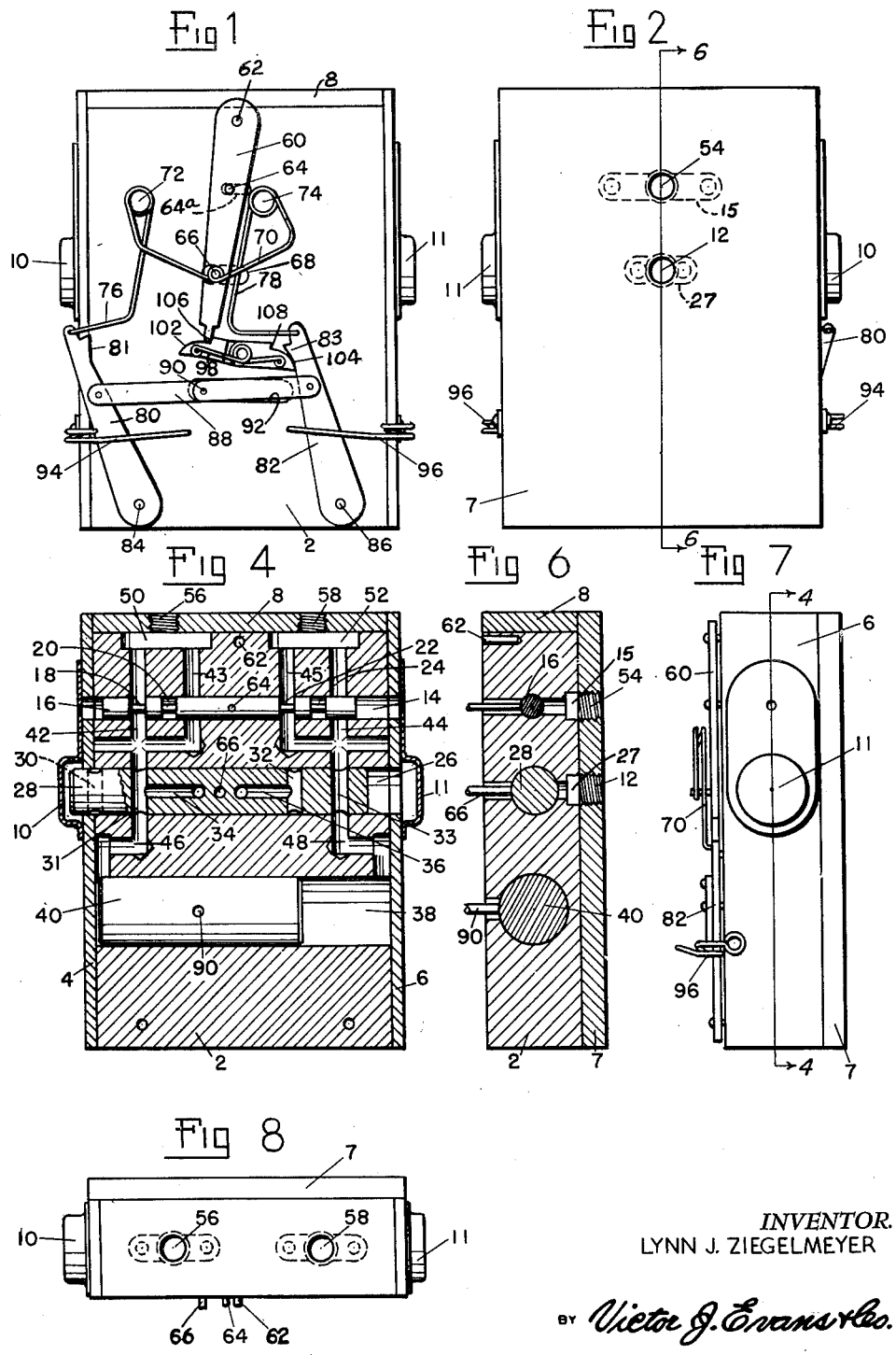

2,613,652

UNITED STATES PATENT OFFICE 2,613,652

PRESSURE OPERATED RECIPROCATING VALVE

Lynn J. Ziegelmeyer, North Hollywood, Calif.

Application January 6, 1947, Serial No. 720,374

5 Claims. (Cl. 121—158)

This invention relates to valve mechanism for controlling the admission and exhaust of fluid pressure to and from chambers provided respectively on the opposite sides of a movable power element, such as a reciprocable piston, an angularly swingable blade or the like in a fluid pressure motor, to cause back and forth movement of such element.

Motors of this type for example are commonly provided for operating automobile windshield wipers, and the valve mechanism of the invention will be described hereinafter in connection with such a motor, but it is to be understood that the valve mechanism is in no way limited to use with windshield wipers.

It is an object of this invention to provide improved valve mechanism of this type.

It is another object of this invention to provide such valve mechanism which does not require installation immediately adjacent the controlled motor or motors.

It is another object of this invention to provide valve mechanism for a fluid pressure motor, so arranged that the motor will not be rendered inoperative by failure of the power element to complete its stroke.

It is another object of this invention to provide valve mechanism for a fluid pressure motor, which will reverse the pressure conditions prevailing in the motor upon the power element of the motor encountering a predetermined resistance to its advance, and cause a return movement of said element.

It is another object of this invention to provide valve mechanism for a fluid pressure motor so arranged as to maintain the power element of the motor operating between points at which it encounters a predetermined resistance, either or both of said points corresponding respectively with the limits of a normal stroke of said element, or being intermediate said limits.

It is another object of this invention to provide such valve mechanism employing the pressure of the controlled fluid to operate the mechanism.

This invention possesses many other advantages and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

In the drawings:

Figure 1 is an elevation of the valve structure, showing the actuating linkage;

Figure 2 is an elevation of the opposite face of the structure;

Figure 3 is a view similar to Figure 1, but showing a different operating position of the parts;

Figure 4 is a transverse section, taken substantially as indicated by line 4—4 of Figure 7, the parts being in the relative positions they would occupy with the linkage positioned as in Figure 1;

Figure 5 is a section similar to Figure 4, but with the parts in the relative positions they would occupy with the linkage positioned as in Figure 3;

Figure 6 is a vertical section taken substantially as indicated by line 6—6 of Figure 2, certain parts being omitted to simplify the figure;

Figure 7 is an end elevation, as seen from the right in Figure 1;

Figure 8 is a top plan view, as seen from above in Figure 1, certain parts being omitted to simplify the figure;

Figures 9, 10, 11 and 12 are cross sections, taken substantially as indicated by correspondingly numbered lines on Figure 5; certain parts being omitted to simplify the figures;

Figure 13 is a fragmentary vertical section, taken substantially as indicated by line 13—13 of Figure 5; and Figure 14 is a diagram showing the valve structure of the invention connected to a fluid pressure motor.

Referring now to the drawings in detail wherein like characters indicate like parts, the control comprises a body 2 having side pieces 4 and 6, with a back 7 and top 8, all appropriately secured as by screws, not shown.

Side covers 10 and 11 are attached to the side pieces 4 and 6 respectively, and a rear port 12 permits the inlet of fluid pressure. Thus, for example, vacuum pressure may be supplied from the manifold of a vehicle motor, or pressure above atmospheric may be supplied.

An upper lateral valve chamber 14 extends across the body 2 and accommodates the piston or valve member 16 having spaced circumferential grooves 18, 20, 22 and 24 thereon. This piston is free to reciprocate in the chamber 14 under control of the hereinafter described linkage. A rear communication passage 15 serves to connect a pair of ports 15-a and 15-b entering chamber 14 at axially spaced points with an outlet or exhaust port 54.

An intermediate lateral valve chamber 26 has reciprocable therein the piston or valve member 28 formed with vertical passages therethrough 30, 31, 32, and 33 with longitudinal connecting passages 34 and 36 adapted to communicate through radial extensions 34-a and 36-a and axially spaced ports 27-a and 27-b, with the by-pass 27 which is connected with the pressure inlet 12.

A lower lateral chamber or cylinder 38 contains the power piston 40 and pressure communication is provided between the three lateral chambers or cylinders by vertical passages 42 and 44, the angular portions of these vertical passages as 46 and 48 providing for the pressure communication at the ends of the cylinder or passage 38.

By-pass passages 43 and 45 pass through the cylinder or chamber 14 and are connected respectively with the vertical passages 42 and 44.

Top connecting passages 50 and 52 provide pressure outlet and inlet from and to the opposite sides of the pressure operated motor in accordance with the positions of the valve members 16 and 28, while the outlet 54 communicating with the chamber 14 permits the return of the fluid under pressure either to a reservoir, or in the case of air under pressure, to the atmosphere.

The ports 56 and 58 are normally provided with pipe or tube connections to the opposite sides of the operating member in the pressure motor.

The control for the pistons or valve members 16 and 28 in the chambers 14 and 26 respectively, comprises a lever 60 pivoted at 62 on the body and pivotally connected by pin 64 to the piston 16, and by pin 66 to the piston 28, the pins 64 and 66 being movable laterally within the slots 64-a and 68 respectively in the body 2.

Two springs connected at pin 66 are also mounted on the lever about the pin 66 and these springs are fashioned with loops 72 and 74, and legs 76 and 78 respectively engaging the upper ends of the levers 80 and 82 having cam faces 81 and 83, and respectively pivoted on the body 2 at 84 and 86.

Connecting links 88 pivotally connect the levers 80 and 82, respectively, and a pin 90 on the piston 40, movable laterally in the slot 92 in the body. Snap springs 94 and 96 releasably engage the levers 80 and 82.

As best shown in Fig. 12, the springs 94 and 96 each have their free ends bent inwardly or otherwise formed to provide a hump or detent forming portion adapted to engage behind the inner edge of the respective levers 80 and 82 when at the outer extremity of their respective movements. Thus, in Figs. 3 and 12, the detent portion of spring 96 is engaged with the edge of the lever 82. The arrangement is such that a "snap over" action is provided between the springs and the respective levers which restrains the levers and the connected piston 40 against movement from either of its endmost positions until sufficient pressure has been built up behind piston 40 to overcome the restraining action of the spring, after which the detent portion rides up on the lever so that only a small frictional restraint is exerted on movement of the piston and connected levers. Spring 94 is shown in this position in Fig. 12. Since, as has been pointed out, the spaces formed in chamber 38 in the opposite sides of the piston 40 are connected with the opposite sides of the operating member in the pressure motor, the pressures in the chamber 38 acting on the piston 40 are the same as those acting in the pressure motor and accordingly the release of the lever 80 or 82 by the respective springs 94 and 96 is a function of the pressure conditions in the motor.

An angular detent is positioned below the vertical axis of the lever 60 and comprises arms 98 and 100 formed with cams 102 and 104 with notches 106 and 108 adapted to engage the reduced end of lever 60, the arms being pivotally secured for independent movement on a common pin 109 and urged upwardly toward each other by means of the spring 110.

In Figure 14, the valve structure is generally indicated by V, the port 12 being shown as connected with a suitable fluid pressure source S by a conduit 120. A fluid pressure motor of any preferred type, is indicated by M and is shown by way of example as comprising a cylinder 121 with a piston 122 reciprocable therein and having a rod 123 by the aid of which it is operatively connected to a windshield wiper blade or the like, not shown. The piston 122 divides the cylinder 121 into a pair of pressure spaces connected respectively as by conduits 124 and 126 with ports 56 and 58 in the valve body 2.

In operation, referring to Figures 1 and 4, assuming air under pressure entering the port 12, the pressure will force the air through the passage 34 through passage 31 and out through the communicating passage 50 and the opening 56 to one chamber of the pressure operated motor. The other chamber of the pressure operated motor is connected via opening 58, passage 45, circumferential groove 22, and passages 15-a and 15 with the exhaust port 54. At the same time the pressure will act through the passage 31 through the piston 28 and port 46 against the left hand end of the power piston 40.

When the actuating piston 22 of the pressure motor finds a predetermined resistance, as by reaching the end of its normal stroke or by encountering an obstruction, such as snow in the case of a windshield wiper, at some intermediate point, the pressure will increase against the end of the piston 40 until it reaches a point where the pressure will overcome the tension of the snap springs 94 and 96, which will thereupon release levers 80 and 82 for movement by the piston 40 as previously discussed.

As the piston 40 moves to the right the levers 80 and 82 through the medium of the pin 90 and link 88 also move pressing upon the spring 70. At this time fluid discharges from the right hand end of chamber 38 via passage 48, ports 33, 45, circumferential groove 22, opening 15-a and 15 to the exhaust port 54. As the pressure on the spring increases with the movement of the levers 80 and 82 the cam face 81 will abut the cam face 102, tripping the arm 98 and releasing the lever 60 from the notch 106, as the piston 40 nears the end of its stroke. The lever 60 will then snap over to the right carrying the pistons 16 and 28 with it so that the parts will assume the position indicated in Figures 3 and 5.

The pressure entering through port 12 will then force the air or fluid through the passages 36 and 32 of the piston 28, thence through vertical passages 44 and 24 to the lateral passages 52 and 58 and out to the opposite side of the motor piston. Pressure will also be exerted downwardly through passage 44 to abut the right end of the piston 40. At this time fluid is free to flow from the motor via port 56, passage 43, circumferential groove 20 and passages 15-b and 15 to exhaust port 54 and from the left-hand end of chamber 38 via passages 46, 30 and 43, circumferential groove 20 and passages 15-b and 15 to the exhaust port 54. When the resistance again increases to the point where the tension of the spring will be overcome, the control will again reverse, causing continued operation of the motor, and insuring uninterrupted operation at normal or reduced stroke.

It will be apparent from the above that when used with a windshield wiper motor involving either pressure or vacuum with the ports 56 and 58 connected to opposite sides of the motor, snow and ice will create a resistance to the wiper which in the conventional motor without the control of my invention would stop the wiper and motor. However, with the control herein described in operation instead of the motor stopping, the power flow will be reversed and the wiper will continue with pressure intermittently being applied to opposite sides of the motor.

Having thus fully described my invention what I claim as new and desire to secure by Letters Patent is:

1. In a fluid pressure valve mechanism; means, including a pair of reciprocable valve members operable between limiting positions, for connecting respectively the pressure spaces of a fluid pressure motor, said motor including a movable power element separating said spaces, with a fluid pressure inlet and a fluid pressure outlet, said valve members in one of said positions serving to connect one of said spaces with said inlet and the other space with said outlet and in the other of said positions to connect said one space with said outlet and said other space with said inlet, latch means for releasably retaining said valve members in either of said positions, a member movable in response to a predetermined pressure rise in the space connected with said inlet, means operated by said member upon a predetermined movement for releasing said latch and causing movement of said valve members from one position to the other position.

2. In a fluid pressure valve mechanism; means, including a pair of reciprocable valve members operable between limiting positions, for connecting respectively the pressure spaces of a fluid pressure motor, said motor including a movable power element separating said spaces, with a fluid pressure inlet and a fluid pressure outlet, said valve members in one of said positions serving to connect one of said spaces with said inlet and the other space with said outlet and in the other of said positions to connect said one space with said outlet and said other space with said inlet, latch means for releasably retaining said valve members in either of said positions, a member movable in response to pressure in the space connected with said inlet, means restraining said member against movement until said pressure reaches a predetermined amount, said restraining means including an element operable by said member for releasing said latch and thereafter causing movement of said valve members from one position to the other position upon predetermined movement of said member.

3. In a fluid pressure valve mechanism; means, including a pair of reciprocable valve members operable between limiting positions, for connecting respectively the pressure spaces of a fluid pressure motor, said motor including a movable power element separating said spaces, with a fluid pressure inlet and a fluid pressure outlet, said valve members in one of said positions serving to connect one of said spaces with said inlet and the other space with said outlet and in the other of said positions to connect said one space with said outlet and said other space with said inlet, latch means for releasably retaining said valve members in either of said positions, a member movable in response to pressure in the space connected with said inlet, means restraining said member against movement until said pressure reaches a predetermined amount, energy storing mechanism, and means operatively connecting said mechanism and said valve members, said restraining means including an element operable by said member for releasing said latch and activating said energy storing mechanism in response to movement of said abutment, said element upon predetermined movement of said member releasing said latch, and whereby said mechanism moves said valve members from one position to the other position.

4. In a fluid pressure valve mechanism: means forming a valve body comprising a pair of valve chambers; means in said body forming a fluid outlet; means in said body forming a fluid inlet; there being a pair of ports in said body adapted for connection respectively with a pair of fluidtight spaces separated by a movable power element in a fluid pressure motor, there being passages in said body respectively connecting said ports with each of said chambers, a valve member movable in each chamber, one of said valve members being adapted to cooperate with some of said passages to connect either of said ports with said outlet and cooperating with other of said passages as well as with the other of said valve members to connect the other of said ports with said inlet, in accordance with the position of said valve members, means forming a pair of fluidtight pressure chambers separated by a movable abutment, passage forming means cooperating with said other valve member to connect either of said pressure chambers with said inlet and the other chamber with said outlet in accordance with the position of said valve member, means connecting said valve members for operation in response to movement of said abutment, and means releasably restraining movement of said abutment.

5. In a fluid pressure valve mechanism: means forming a valve body comprising a pair of valve chambers; means in said body forming a fluid outlet; means in said body forming a fluid inlet; there being a pair of ports in said body adapted for connection respectively with a pair of fluidtight spaces separated by a movable power element in a fluid pressure motor, there being passages in said body respectively connecting said ports with each of said chambers, a valve member movable in each chamber, one of said valve members being adapted to cooperate with some of said passages to connect either of said ports with said outlet and cooperating with other of said passages as well as with the other of said valve members to connect the other of said ports with said inlet, in accordance with the position of said valve members, means forming a pair of fluidtight pressure chambers separated by a movable abutment, passage forming means cooperating with said other valve member to connect either of said pressure chambers with said inlet and the other chamber with said outlet in accordance with the position of said valve member, means including a pivoted lever connecting said valve members for movement between positions connecting one of said ports to said inlet and the other port to said outlet or vice versa in response to movement of said abutment, latch means cooperating with said lever to retain said members in either of said positions, and means releasably restraining movement of said abutment.

LYNN J. ZIEGELMEYER.

REFERENCES CITED

The following references are of record in the file of this patent:

UNITED STATES PATENTS

| Number | Name | Date |
|---|---|---|
| 382,168 | Lechtenberg | May 1, 1888 |
| 1,831,035 | Sanborn | Nov. 10, 1931 |
| 1,938,758 | Ernst | Dec. 12, 1933 |
| 1,952,690 | Strom | Mar. 27, 1934 |
| 2,072,403 | Lausen | Mar. 2, 1937 |
| 2,165,966 | Hall et al. | July 11, 1939 |
| 2,175,398 | Hull | Oct. 10, 1939 |
| 2,298,457 | Berges | Oct. 13, 1942 |
| 2,302,232 | MacNeil | Nov. 17, 1942 |
| 2,397,599 | Folberth et al. | Apr. 2, 1946 |